Figure 1:
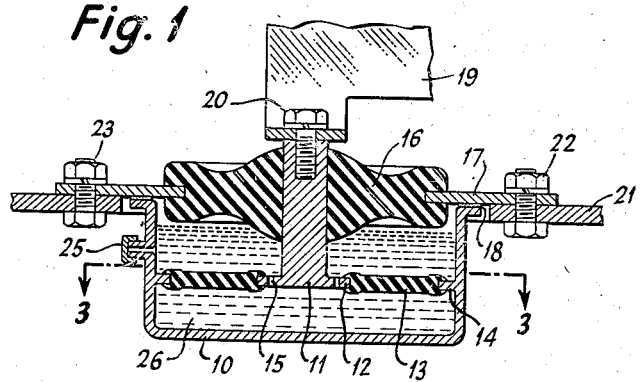

Oct. 16, 1945.   L. E. HARDING   2,387,065
MOUNTING
Filed Dec. 11, 1943

INVENTOR
LLOYD E. HARDING
BY
William A. Zalesak
ATTORNEY

Patented Oct. 16, 1945

2,387,065

UNITED STATES PATENT OFFICE 2,387,065

MOUNTING

Lloyd E. Harding, Bradley Beach, N. J., assignor of one-fifth to Edmund J. Lada, Woodhaven, N. Y., and one-fifth to William A. Zalesak, Union, N. J.

Application December 11, 1943, Serial No. 513,848

10 Claims. (Cl. 248—358)

My invention relates to mounts for equipment subjected to shock and vibration, more particularly to improved methods for resiliently supporting equipment and for damping vibration.

Viscous damping has been found to be an excellent means to neutralize vibration and to provide shock isolation. A familiar form of such viscous damping device is the hydraulic shock absorber which makes use of a piston travelling in a cylinder and displacing a fluid through apertures in the piston or by means of side vents on pipes connecting the two ends of the cylinder. The cylinder is attached to one unit of the moving parts, while the piston is attached to the other. Movement of the two parts with relation to each other is retarded, slowed down or damped by the piston action on displacing the fluid from one section of the cylinder to the other. In this operation work is performed in forcing fluid through vents and energy of the shock is dissipated.

There are, however, practical objections to this type of shock absorber. The maintenance cost is high, as is the case with any constantly acting devices where there is close tolerance between two moving members. In certain types of equipment it is not possible to make a unit of small enough size to fit it to the design or the space available.

One form of device has been developed to replace the damping shock absorber described. It makes use of rubber or rubber-like material made up into mounts and used either with rubber in shear or in compression. A rubber disc or plate is bonded to a metal collar or ring at its edges and the collar or ring used as a mounting plate attached to a stationary support. A centrally positioned rod or tube is bonded to the rubber at the center of the rubber disc or plate and to this is secured the load equipment, which is to be protected against vibration and shock. The shock absorbing action is supposed to result from flexing of the rubber disc and the diaphragm-like motion as the load is set into vibration or subjected to shock.

While this type of shock absorber provides a solution for the question of size, it does not have the energy dissipating abilities of the piston type shock absorber. Further, if it happens that the natural frequency of the vibration of the mount and equipment approaches that of the disturbing shock, resonance is established and the mount becomes useless and may even cause the equipment supported as a load to destroy itself. While the last mentioned form of absorber can be designed to prevent vibration of the load at a given resonant frequency, it cannot at the same time be designed to protect against shock in addition to the vibration, for example, when it is used in connection with planes which are subjected to landing shocks, where a shock mount is needed to dissipate energy over a wide range of frequencies.

Again in connection with the rubber mounted support, rubber shoulders are provided which act as bumpers when the shock received is greater than that for which the mount was designed. Without the provision of the bumper shoulder, the load would move beyond the permissible limits and perhaps tear itself loose by tearing the rubber from its bond with the metal. The action of the equipment hitting the bumper, however, results in damage to the equipment.

It is, therefore, a principal object of my invention to provide an improved type of mount for resiliently supporting equipment which will dissipate shock energy and prevent vibration.

Another object of my invention is to provide such a mount which is not subject to vibration at a resonant frequency.

A still further object of my invention is to provide a mount which has the advantages of viscous damping but which at the same time is sufficiently small and compact to be utilized with equipment where space requirements are rigid.

It is another object of my invention to provide such a device which will function when mounted in any position.

These and other objects will appear hereinafter.

Figure 2:
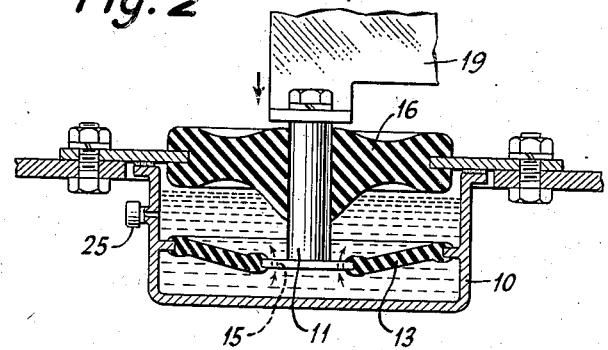
Figure 3:
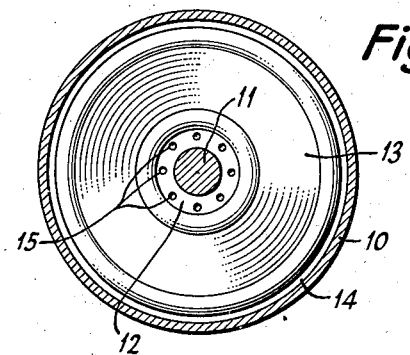

The novel features which I believe to be characteristic of my invention are set forth with particularity in the appended claims, but the invention itself will best be understood by reference to the following description taken in connection with the accompanying drawing in which Figure 1 is a longitudinal section of a mount support made in accordance with my invention in a position of rest, Figure 2 is a longitudinal section of the device shown in Figure 1 during operation, and Figure 3 is a transverse section taken along the line 3—3 of Figure 1.

In accordance with my invention I provide both the advantages of rubber mounting permitting compact small units and at the same time utilize viscous damping to dissipate shock energy.

Referring to Figure 1, a device made according to my invention comprises a cup-shaped or pot-shaped member 10 having supported at its center for axial movement a central element 11 which may be a tube or rod or sleeve, such as shown, and having a flange 12 secured to its lower end, this flange being provided with a plurality of apertures 15 disposed near its rim. Secured between this member and a lip 14 on the inner wall of pot 10 is a flexible resilient diaphragm 13, preferably of rubber, which seals the upper and lower portions of the pot from each other, except through the apertures 15.

The upper portion of the element 11 has bonded to it a transverse resilient element 16 which may be of rubber and which may be placed under stress. The outer periphery of this member is secured to a cover plate 17 sealed to the pot at 18, for example, by welding. This plate 17 is secured to a stationary mounting bracket 21 by means of the nuts and bolts 22, the load or equipment 19 being supported at the upper end of stud 11 and secured thereto by bolt 20. The pot 10 may be filled with liquid through the filling aperture shown generally at 25. Inasmuch as the device is sealed it may be almost completely filled and mounted in any position.

When the load becomes subjected to vibration the element 16 acts much like a spring for supporting a load and energy is stored in this diaphragm. However, the action is damped by the action of the fluid flowing through the apertures 15 in the flange member 12. The size of the apertures may be made such as to heavily damp the vibration or to obtain damping to any degree. Thus by means of my arrangement the spring action of the rubber diaphragm is obtained as well as the damping action which is the advantage of the piston type device. Inasmuch as there are no closely fitted relatively movable parts, the maintenance problem is solved and at the same time the requirement of small size and compactness is also obtained.

It is obvious the apparatus could be so designed that an additional spring could be used between the load 19 and the bracket 21 or plate 17 so that the mount made according to my invention is subject to loads only when the device is subjected to shock and vibration and not under static conditions. The broad idea is to spring support the load and at the same time provide viscous damping.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A mount for supporting a load subjected to vibration and shock and including a member to be fixed to a load and subjected to axial movement, a supporting element adapted to be secured to a fixed support and having a central opening, and resilient means fixed between said member and said element and resiliently supporting said member within said opening, means associated with said member and said element and providing viscous damping, said means including an apertured element and a pot shaped element containing a fluid and within which said apertured element is mounted for axial movement, said liquid having access to opposite sides of said apertured element only through the apertures.

2. A mount for supporting a load subjected to vibration and shock and including a cup-shaped member closed at one end by a transverse flexible resilient member, an elongated rod-like load supporting element positioned centrally of said flexible resilient member and extending axially into said cup-shaped member, the inner end of said elongated rod-like element having a transverse flange thereon, said flange having apertures extending therethrough, and a fluid within said cup-shaped member, said fluid having access to opposite sides of said flange only through said apertures.

3. A mount for supporting a load subjected to vibration and shock and including cup-shaped member closed at one end by a transverse flexible resilient member, an elongated rod-like load supporting element positioned centrally of said flexible resilient member and extending axially into said cup-shaped member, the inner end of said elongated rod-like element having a transverse flange thereon, said flange having apertures extending therethrough and a flexible diaphragm sealing the edges of said flange to the interior wall of said cup-shaped member, and a fluid within said cup-shaped member.

4. A mount for supporting a load subjected to vibration and shock and including a cup-shaped member, an elongated rod-like load supporting element positioned centrally of said cup-shaped member and extending axially into said cup-shaped member, resilient means connected between said cup-shaped member and said elongated rod-like element, the inner end of said elongated rod-like element having a transverse flange thereon, said flange having apertures extending therethrough and a flexible diaphragm sealing the edges of said flange to the interior wall of said cup-shaped member, and a fluid within said cup-shaped member.

5. A mount for supporting a load subjected to vibration and shock and including a shallow pot-shaped member having transversely of its ends a lip extending inwardly of said pot-shaped member, a rod-like element positioned centrally of said pot-shaped member and a transverse resilient element bonded to said rod-like element and sealed to the top of said pot-shaped member, a flange on the lower end of said rod-like element provided with a plurality of apertures spaced around the circumference thereof, and a resilient diaphragm connected between said flange and the lip within said pot-shaped member, said pot-shaped member being substantially filled with a fluid.

6. A mount for supporting a load subjected to vibration and shock and including a shallow pot-shaped member having transversely of its ends a lip extending inwardly of said pot-shaped member, a rod-like element positioned centrally of said cup-shaped member, an apertured cover plate sealed to the top of said pot-shaped member and through which the rod-like element extends, and a transverse resilient element bonded to said rod-like element and sealed to the inner edge of said cover plate, a flange on the lower end of said rod-like element provided with a plurality of apertures spaced around the circumference thereof, and a resilient diaphragm connected between said flange and the lip within said pot-shaped member, said pot-shaped member being filled with a fluid.

7. A mount for supporting a load subject to vibration and shock and including a member to be fixed to a load and subjected to axial movement, a supporting element adapted to be secured to a fixed support and provided with a central aperture and resilient means fixed between said member and said element and supporting said member within said aperture, and means associated with said member and said element and providing viscous damping, said means including a hollow member containing a fluid, said axially movable member extending within said hollow member, a transverse flange carried by said axially movable member and submerged in said fluid for movement within said fluid, said transverse flange being constructed to permit movement of said fluid from one side of said flange to the other to provide viscous damping.

8. A mount for supporting a load subjected to vibration and shock and including a hollow member adapted to be secured to a fixed support, a load supporting member to be fixed to a load and subjected to axial movement and extending within said hollow member, and a resilient transverse diaphragm at one end of said hollow member and connected between said hollow member and said load supporting member, a second resilient diaphragm extending between said hollow member and said load supporting member, said load supporting member being provided with a transverse flange within said hollow member, said hollow member containing a liquid in which said flange is submerged and moves to provide viscous damping.

9. A mount for supporting a load subjected to vibration and shock and including a member to be fixed to a load and subjected to axial movement, a supporting structure adapted to be secured to a fixed support and including a hollow member into which said axially movable member extends, said hollow member containing a liquid, a transverse resilient diaphragm connected between the supporting structure and the axially movable member and closing one end of said hollow member, and a second transverse resilient diaphragm extending between another portion of said axially movable member and the walls of said hollow member, said axially movable member having means thereon movable within said liquid and constructed to permit movement of the liquid from one side of said means to the other for providing viscous damping of said member.

10. A mount for supporting a load subjected to vibration and shock and including a rod-like member having one end to be fixed to a load and subjected to axial movement, a hollow member to be fixed to a support into which said rod-like member extends, said hollow member containing a liquid, a transverse resilient diaphragm connected between the hollow member and the rod-like member and closing one end of said hollow member, and a second transverse resilient diaphragm extending between another portion of said rod-like member and the walls of said hollow member, said rod-like member having a transverse flange thereon movable within said liquid and constructed to permit movement of the liquid from one side of said flange to the other for providing viscous damping of said rod-like member.

LLOYD E. HARDING.